United States Patent
Sbodio et al.

(10) Patent No.: US 11,314,984 B2
(45) Date of Patent: Apr. 26, 2022

(54) INTELLIGENT GENERATION OF IMAGE-LIKE REPRESENTATIONS OF ORDERED AND HETEROGENOUS DATA TO ENABLE EXPLAINABILITY OF ARTIFICIAL INTELLIGENCE RESULTS

(71) Applicant: INTERNATIONAL BUSINESS MACHINES CORPORATION, Armonk, NY (US)

(72) Inventors: Marco Luca Sbodio, Dublin (IE); Natalia Mulligan, Dublin (IE); Joao Bettencourt-Silva, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 247 days.

(21) Appl. No.: 16/546,048

(22) Filed: Aug. 20, 2019

(65) Prior Publication Data
US 2021/0056347 A1    Feb. 25, 2021

(51) Int. Cl.
G06K 9/62    (2022.01)
G06N 3/08    (2006.01)

(52) U.S. Cl.
CPC ......... *G06K 9/6256* (2013.01); *G06K 9/6232* (2013.01); *G06K 9/6253* (2013.01); *G06N 3/08* (2013.01)

(58) Field of Classification Search
CPC .. G06K 9/6256; G06K 9/6232; G06K 9/6253; G06N 3/08; G06N 3/0454
See application file for complete search history.

(56) References Cited

U.S. PATENT DOCUMENTS

| | | | |
|---|---|---|---|
| 5,337,362 A | 8/1994 | Gormish et al. | |
| 8,022,831 B1 | 9/2011 | Wood-Eyre | |
| 9,514,388 B2 | 12/2016 | Chen et al. | |
| 10,185,893 B2 | 1/2019 | Townsend et al. | |
| 2001/0047261 A1 | 11/2001 | Kassan | |
| 2010/0015579 A1 | 1/2010 | Schlabach | |
| 2015/0084964 A1 | 3/2015 | Cardno | |
| 2020/0249651 A1* | 8/2020 | Lee | G06N 3/0454 |
| 2021/0019620 A1* | 1/2021 | Munoz Delgado | G06N 3/04 |
| 2021/0049452 A1* | 2/2021 | Fan | G06F 11/079 |

(Continued)

FOREIGN PATENT DOCUMENTS

CN        102436539 A    5/2012

OTHER PUBLICATIONS

Wang, Jindong et al., "Deep learning for sensor-based activity recognition: A survey", Pattern Recognition Letters 119 (2019) 3-11. Available online Feb. 21, 2018.*

(Continued)

*Primary Examiner* — Samir A Ahmed
(74) *Attorney, Agent, or Firm* — Griffiths & Seaton PLLC

(57) ABSTRACT

Embodiments for intelligent interpretation of image processing results using machine learning in a computing environment by a processor. One or more data sets may be transformed into one or more pseudo-image representations to enable one or more image processing tasks for image processing. An interpretation of an image processing task result from applying the one or more image processing tasks on the one or more pseudo-image representations generated from one or more data sets.

9 Claims, 17 Drawing Sheets

(56) References Cited

U.S. PATENT DOCUMENTS

2021/0241616 A1* 8/2021 Abdulhai ............... G06N 3/006

OTHER PUBLICATIONS

Z. Zhu, C. Yin, B. Qian, Y. Cheng, J. Wei and F. Wang, "Measuring Patient Similarities via a Deep Architecture with Medical Concept Embedding," 2016 IEEE 16th International Conference on Data Mining (ICDM), Barcelona, 2016, pp. 749-758. doi: 10.1109/ICDM.2016.0086 (10 Pages).
Wang, Z., & Oates, T. (2015). "Encoding Time Series as Images for Visual Inspection and Classification Using Tiled Convolutional Neural Networks." (7 Pages).
Zhiguang Wang and Tim Oates. 2015. "Imaging time-series to improve classification and imputation." In Proceedings of the 24th International Conference on Artificial Intelligence (IJCAI'15), Qiang Yang and Michael Wooldridge (Eds.). AAAI Press 3939-3945 (7 Pages).
Shah Singh, Monit & Pondenkandath, Vinaychandran & Zhou, Bo & Lukowicz, Paul & Liwickit, Marcus. (2017). Transforming sensor data to the image domain for deep learning—An application to footstep detection. 2665-2672. (8 Pages).
Ribeiro, M. T., Singh, S., & Guestrin, C. (Aug. 2016). "Why Should ITrust You?": Explaining the Predictions of Any Classifier. arXiv. 1602.04938 (10 Pages).
Lundberg, S. M., & Lee, S.-I. (Nov. 2017). "A Unified Approach to Interpreting Model Predictions." (10 Pages).
Ribeiro, M. T., Singh, S., & Guestrin, C. (2018). "Association for the Advancement of Artificial Intelligence (www.aaai.org) Anchors: High-Precision Model-Agnostic Explanations" (9 Pages).

* cited by examiner

| CLASS | TEMPORAL TYPE | EVENT ID | DATE |
|---|---|---|---|
| CAREPLANS | START | 8a2b7c96-1967-438c-acc8-4dfd3052448d | 2016-02-14T00:00:00Z |
| CONDITIONS | START | b5a970e-9e7a-4352-9e29-e4bc32b4006c | 2016-02-14T00:00:00Z |
| MEDICATIONS | START | b5a970e-9e7a-4352-9e29-e4bc32b4006c | 2016-02-14T00:00:00Z |
| IMAGING_STUDIES | ISOLATED | edf6ab24-928b-459b-af37-20b583514ff4 | 2016-02-14T23:59:59Z |
| PROCEDURES | ISOLATED | b5a970e-9e7a-4352-9e29-e4bc32b4006c | 2016-02-14T23:59:59Z |
| OBSERVATIONS | ISOLATED | 1a7bf22e-17f3-4471-90a7-8a001422a18e | 2016-02-27T23:59:59Z |
| PROCEDURES | ISOLATED | 1a7bf22e-17f3-4471-90a7-8a001422a18e | 2016-02-27T23:59:59Z |
| CAREPLANS | STOP | 8a2b7c96-1967-438c-acc8-4dfd3052448d | 2016-05-14T23:59:59Z |
| CONDITIONS | STOP | b5a970e-9e7a-4352-9e29-e4bc32b4006c | 2016-05-14T23:59:59Z |
| MEDICATIONS | STOP | b5a970e-9e7a-4352-9e29-e4bc32b4006c | 2016-05-14T23:59:59Z |

| | PROCEDURES | ● PROCEDURES | | | | | | | | | | | | | |
|---|---|---|---|---|---|---|---|---|---|---|---|---|---|---|---|
| | MEDICATIONS | | | | | | | | | | | | | | |
| | CAREPLANS | | | | | | | | | | | | | | |
| | CONDITIONS | | | | | | | | | | | | | | |
| | ● IMAGING_STUDIES | ● OBSERVATIONS | | | | | | | | | | | | | |

2016-02-27T23:59:59Z

| 8302-2 | 71.8 | cm |
|---|---|---|
| 72514-3 | 2.3 | {score} |
| 29463-7 | 10.2 | kg |
| 8462-4 | 83.9 | mmHg |
| 8480-6 | 123.0 | mmHg |
| 72166-2 | NEVER SMOKER | |

504

515

FEBRUARY 2016 — MARCH 2016 — APRIL 2016 — MAY 2016

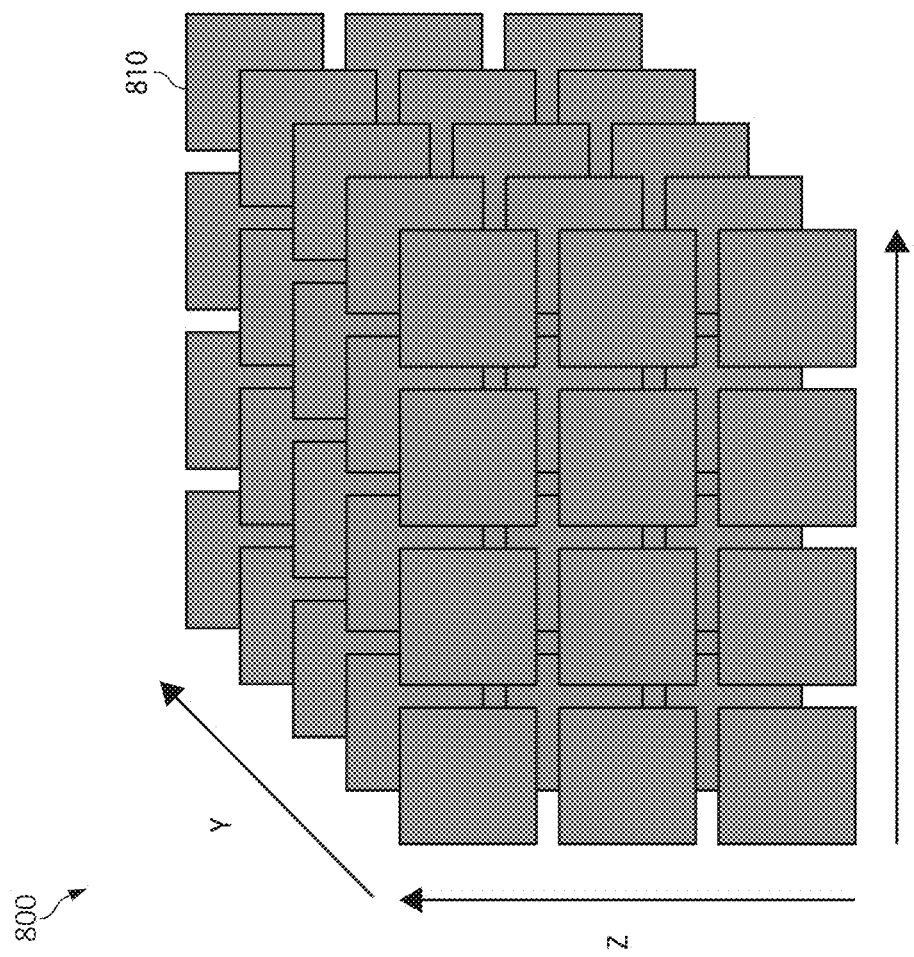

INTELLIGENT GENERATION OF IMAGE-LIKE REPRESENTATIONS OF ORDERED AND HETEROGENOUS DATA TO ENABLE EXPLAINABILITY OF ARTIFICIAL INTELLIGENCE RESULTS

BACKGROUND OF THE INVENTION

Field of the Invention

The present invention relates in general to computing systems, and more particularly, to various embodiments for intelligent generation of image-like representations of ordered and heterogenous data to enable explainability of artificial intelligence results in a computing environment using a computing processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. For example, processing devices, with the advent and further miniaturization of integrated circuits, have made it possible to be integrated into a wide variety of devices. As great strides and advances in technologies come to fruition, these technological advances can be then brought to bear in everyday life. For example, the vast amount of available data made possible by computing and networking technologies may then assist in improvements to improve the quality of life and future life choices and planning.

SUMMARY OF THE INVENTION

Various embodiments for intelligent interpretation of image processing results using machine learning in a computing environment by a processor, are provided. In one embodiment, by way of example only, a method for implementing intelligent generation of image-like representations of ordered and heterogenous data to enable explainability of artificial intelligence results in a computing environment, again by a processor, is provided. One or more data sets may be transformed into one or more pseudo-image representations to enable one or more image processing tasks for image processing. An interpretation of an image processing task result from applying the one or more image processing tasks on the one or more pseudo-image representations generated from one or more data sets.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 5A-5F are diagrams depicting an exemplary operations for intelligent generation of image-like representations of ordered and heterogenous data to enable explainability of artificial intelligence results in a computing environment by a processor in which aspects of the present invention may be realized;

FIG. 8A-8B is a diagram depicting intelligent interpretation of image processing results using machine learning in a computing environment in which aspects of the present invention may be realized;

DETAILED DESCRIPTION OF THE DRAWINGS

Figure 1:
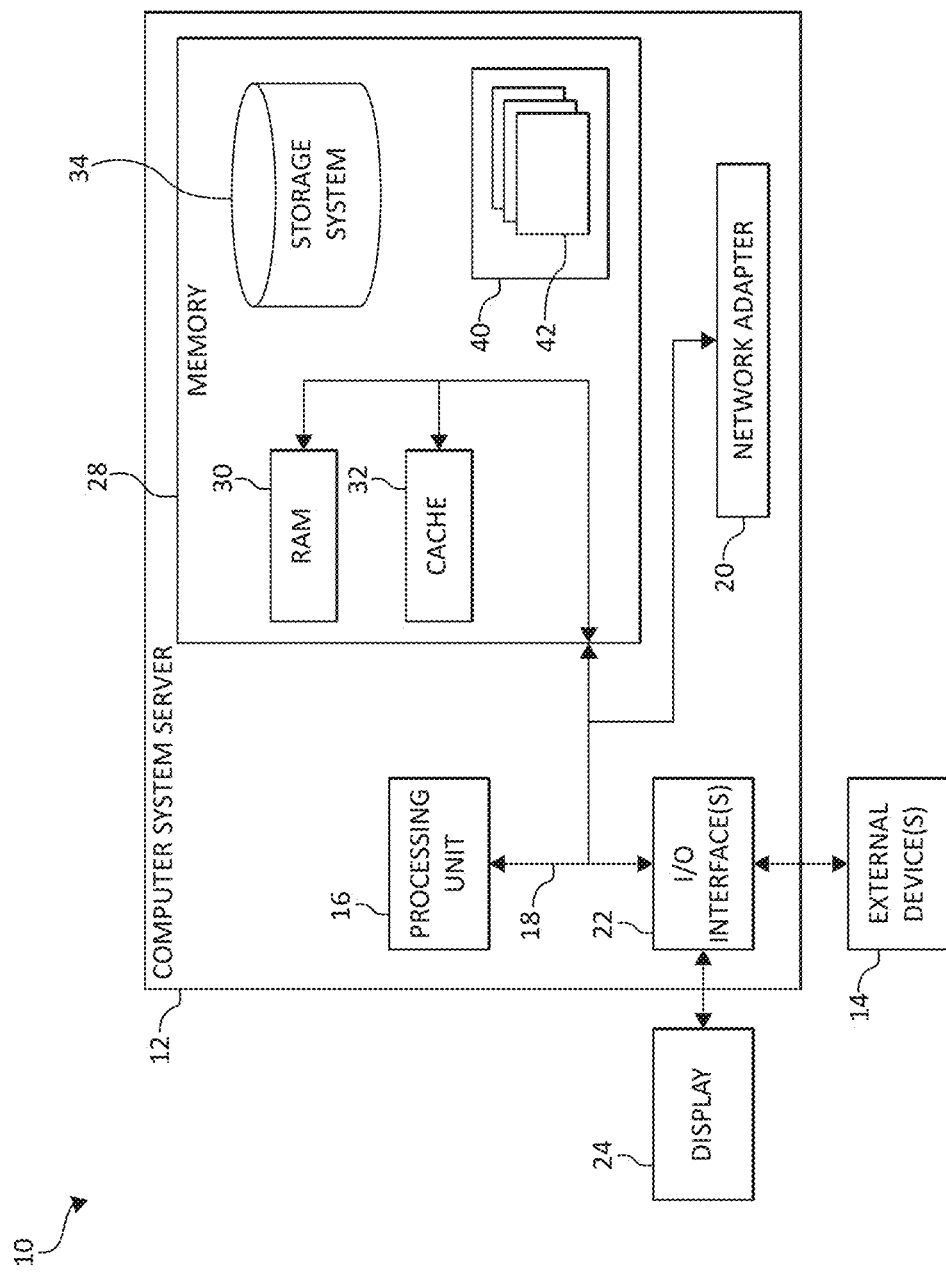
FIG. 1 is a block diagram depicting an exemplary cloud computing node according to an embodiment of the present invention.

As the amount of electronic information continues to increase, the demand for sophisticated information access systems also grows. Big Data is a collection of tools, techniques, and operations used for data sets that becomes so voluminous and complex that traditional data processing applications are inadequate to store, query, analyze or process the data sets using current database management and data warehousing tools or traditional data processing applications. For example, image analysis is an important type of big data analytics. Such analysis may include medical image analysis (e.g., anatomy segmentation, computer aided diagnosis), general three-dimensional ("3D") image analysis (e.g., video analysis) and two-dimensional ("2D") image analysis (e.g., scene reconstruction, event detection, object recognition). Imagine analysis may need to involve machine learning or deep learning operations to produce some image task result and an associated explanation that is human interpretable and refers to an input dataset. Thus, a need exists for artificial intelligence ("AI") systems to employ machine learning and deep learning operations working on image data provide an explanation/interpretation of the image data tasks results.

Accordingly, various embodiments described herein provide a data preparation step to: (a) transform complex heterogeneous data into image-like representations that enables the use of machine learning or deep learning techniques for image processing, and/or (b) build an interpretable explanation of the image processing results obtained by such image-oriented machine learning or deep learning techniques. The explanations may be used as input data (or information derived from them) as evidence.

In one aspect, the present invention provides for implementing intelligent generation of image-like representations of ordered and heterogenous data to enable explainability of artificial intelligence results in a computing environment, again by a processor, is provided. One or more data sets may be transformed into one or more pseudo-image representations to enable one or more image processing tasks for image processing. An interpretation of an image processing task result from applying the one or more image processing tasks on the one or more pseudo-image representations generated from one or more data sets.

Moreover, in dealing with a collection of complex datasets, each dataset may be an ordered collection of heterogeneous data. Thus, machine learning or deep learning operations may be employed to process one or more images to accomplish a task on one or more datasets while building, generating, and/or creating an interpretable explanation of the result of the image processing task. For example, an image processing task may include, but not limited to, classifying an input dataset such as, for example, Di. Another image processing task may compare two datasets Di and Dj according to a selected metric. The present invention may manage and process the collection of complex datasets (e.g., heterogeneous datasets) in the sense that the data in each set dataset Di may be ordered according to a defined/selected criteria such as, for example, a time criteria. The present invention may manage and process the collection of complex datasets (e.g., heterogeneous datasets) such that each data point in every dataset Di belongs to a single class (e.g., one class). In one aspect, the number of classes may be either predefined or learned. Additionally, the classes may be domain specific such as, for example, in the medical domain a class may be "medications", which may include all data related to some medication for the patient. In the "social media" domain, for example, a class may be "location", which may include all data related to geographical places where a user have been/traveled, etc.

It should be noted as used herein, "intelligent" (or "intelligence") may refer to a mental action or process of acquiring knowledge and understanding through thought, experience, and one or more senses using machine learning (which may include using sensor based devices or other computing systems that include audio or video devices). "Intelligence" may also refer to identifying patterns of behavior, leading to a "learning" of one or more events, operations, or processes. The term "intelligent" or "intelligence" may refer to an artificial intelligent/machine learning system. The intelligent system may be a specialized computer system, or set of computer systems, configured with hardware and/or software logic (in combination with hardware logic upon which the software executes) to emulate human cognitive functions. These intelligent systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. An intelligent system may perform one or more computer-implemented cognitive operations that approximate a human thought process while enabling a user or a computing system to interact in a more natural manner. An intelligent system may comprise artificial intelligence logic, such as natural language processing (NLP) based logic, for example, and machine learning logic, which may be provided as specialized hardware, software executed on hardware, or any combination of specialized hardware and software executed on hardware. The logic of the intelligent system may implement the cognitive operation(s), examples of which include, but are not limited to, question answering, identification of related concepts within different portions of content in a corpus, and intelligent search algorithms, such as Internet web page searches.

In general, such intelligent systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16 (which may be referred to herein individually and/or collectively as "processor"), a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
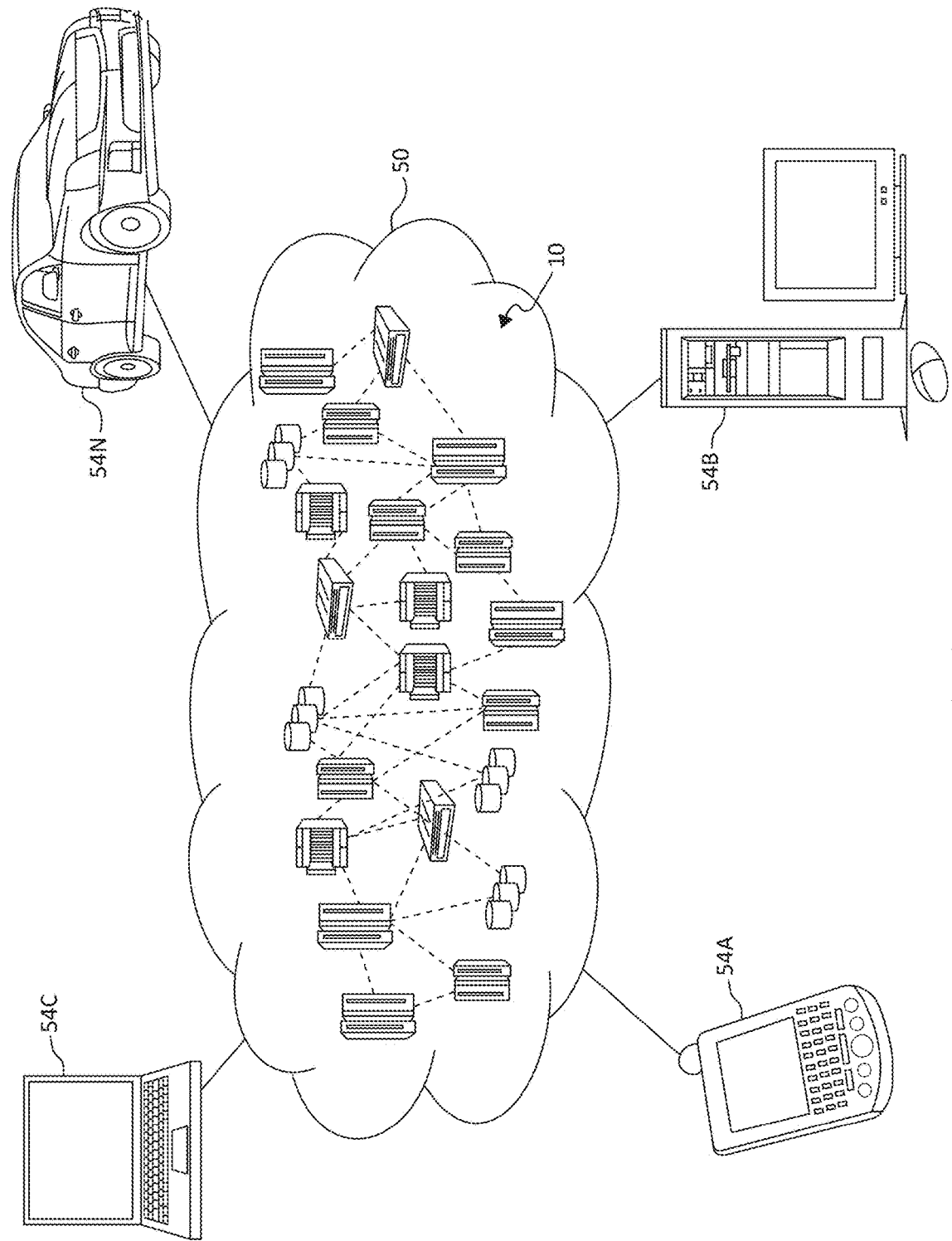
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
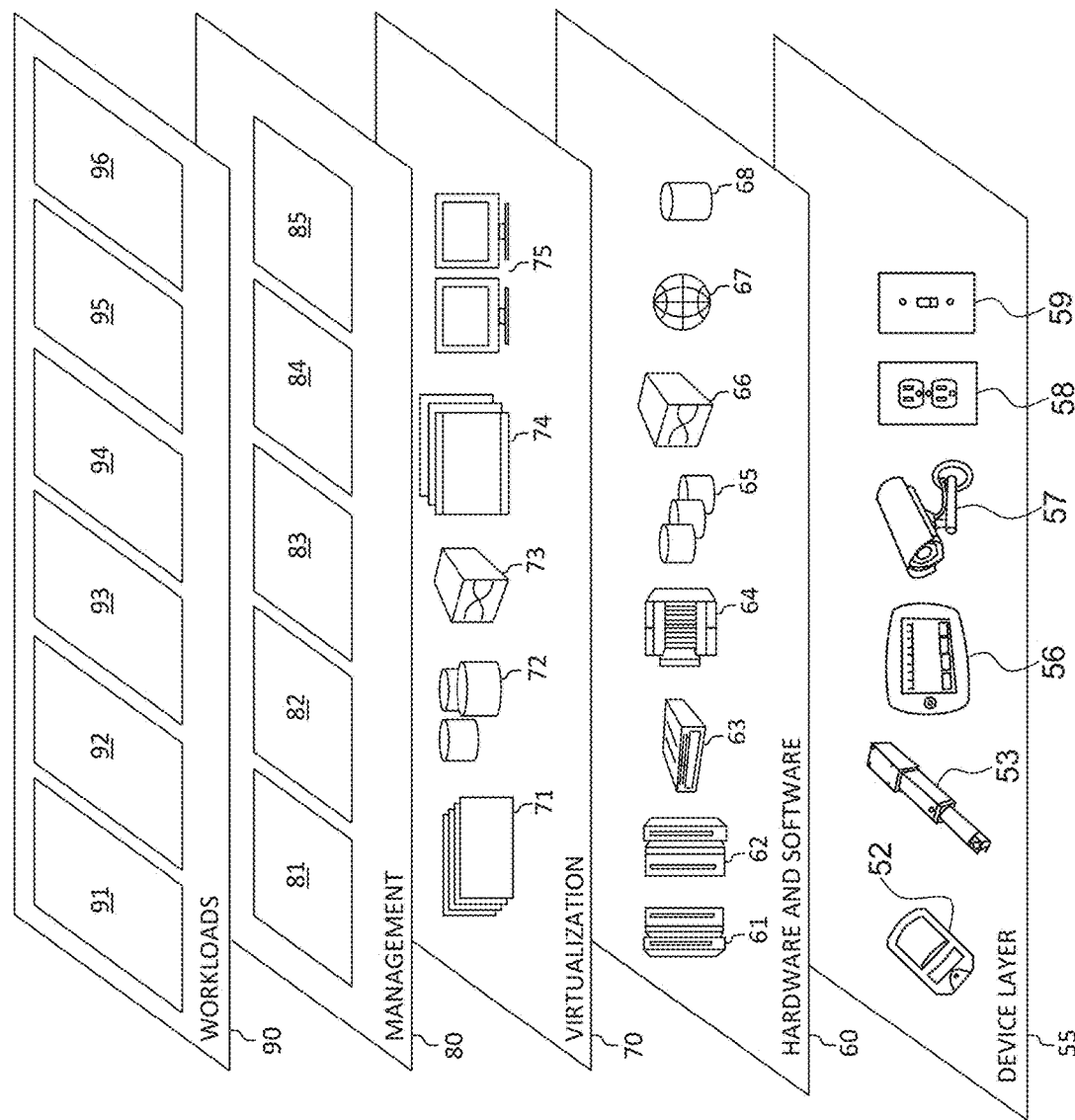
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized.

Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent generation of image-like representations of ordered and heterogenous data to enable explainability of artificial intelligence results in a computing environment. In addition, workloads and functions 96 for intelligent generation of image-like representations of ordered and heterogenous data to enable explainability of artificial intelligence results in a computing environment may include such operations as data analysis, machine learning (e.g., artificial intelligence, natural language processing, etc.), user analysis, IoT sensor device detections, operation and/or analysis, as will be further described. One of ordinary skill in the art will appreciate that the workloads and functions 96 for intelligent generation of image-like representations of ordered and heterogenous data to enable explainability of artificial intelligence results in a computing environment may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

Figure 4A:
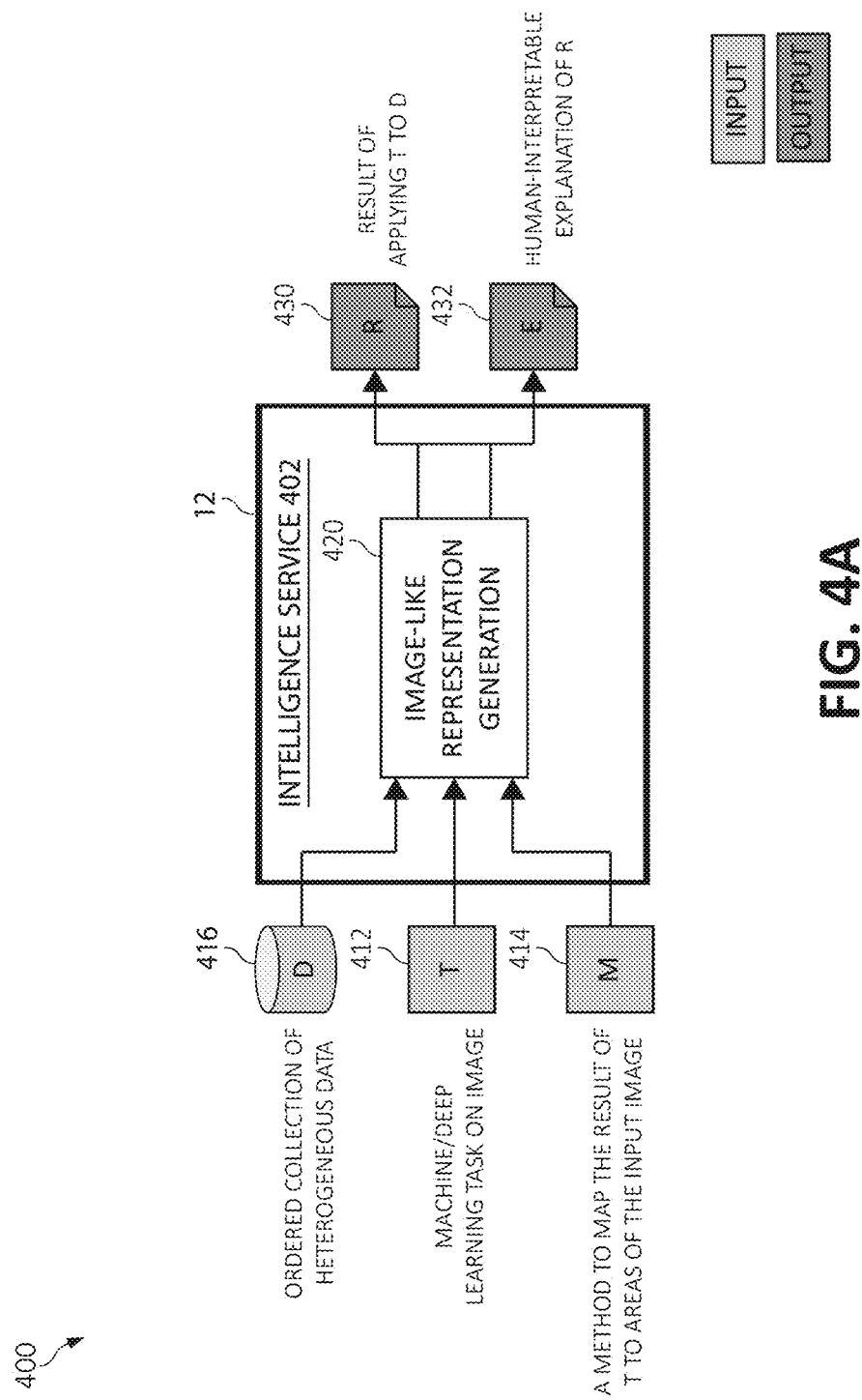
FIGS. 4A-4B is an additional block diagram depicting an exemplary functional relationship between various aspects of the present invention.
Figure 4B:
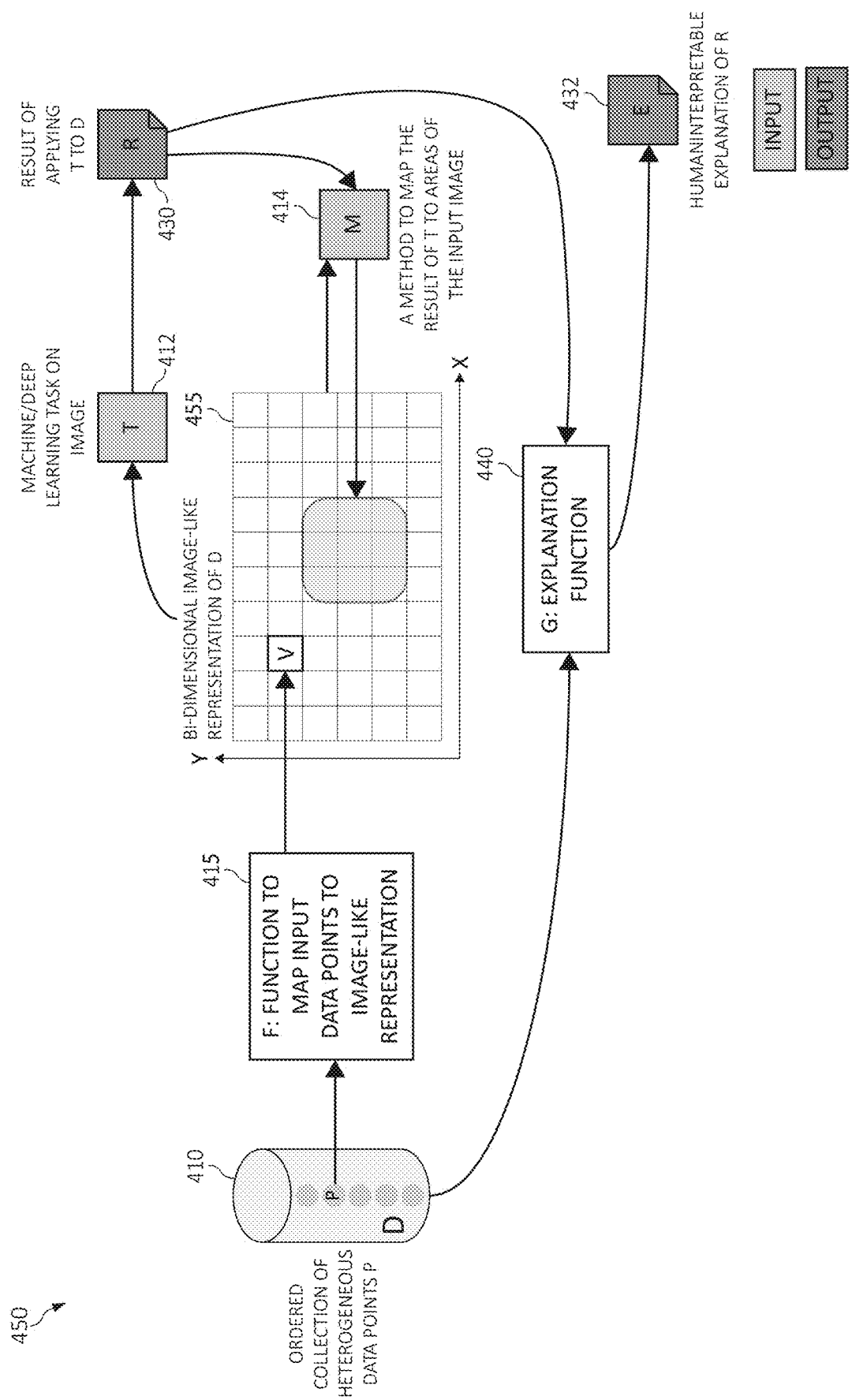

Turning now to FIGS. 4A-4B, a block diagram depicting exemplary functional components 400 of an intelligent generation of image-like representations of ordered and heterogenous data to enable explainability of artificial intelligence results system according to various mechanisms of the illustrated embodiments is shown. In one aspect, one or more of the components, modules, services, applications, and/or functions described in FIGS. 1-3 may be used in FIG. 4. An intelligent generation of image-like representations of ordered and heterogenous data service 402 (e.g., "intelligent service 402") is shown, and may be provided by the computer system/server 12 of FIG. 1.

As one of ordinary skill in the art will appreciate, the depiction of the various functional units in the intelligent generation of image-like representations of ordered and heterogenous data service 402 is for purposes of illustration, as the functional units may be located within the intelligent generation of image-like representations of ordered and heterogenous data service 402 or elsewhere within and/or between distributed computing components.

In one aspect, the computer system/server 12 and/or the intelligent generation of image-like representations of ordered and heterogenous data service 402 may provide virtualized computing services (i.e., virtualized computing, virtualized storage, virtualized networking, etc.). More specifically, the intelligent generation of image-like representations of ordered and heterogenous data service 402 may provide, and/or be included in, a virtualized computing, virtualized storage, virtualized networking and other virtualized services that are executing on a hardware substrate.

The intelligent generation of image-like representations of ordered and heterogenous data service 402 may also include an image-like representation generation component 420, which may transform one or more data sets into one or more pseudo-image representations to enable one or more image processing tasks for image processing and to provide an interpretation of an image processing task result from applying the one or more image processing tasks on the one or more pseudo-image representations generated from one or more data sets.

The intelligent generation of image-like representations of ordered and heterogenous data service 402 may generate the one or more pseudo-image representations from the one or more data sets having an ordered collection of heterogeneous data points.

The intelligent generation of image-like representations of ordered and heterogenous data service 402 may apply the one or more image processing tasks to the one or more pseudo-image representations and determining an image processing task result, and/or associate an image processing task result to one or more areas of the one or more pseudo-image representations.

The intelligent generation of image-like representations of ordered and heterogenous data service 402 may build an explanation of the image processing task by associating each of the one or more areas of the one or more pseudo-image representations to a subset of input data points in the one or more data sets and to a set of additional information determined from the subset of input data points. The intelligent generation of image-like representations of ordered and heterogenous data service 402 may also define the one or more pseudo-image representations to include one or more elements, wherein the one or more elements include a value and a set of coordinates specifying a position of the one or more elements within the one or more pseudo-image representations, and/or map the one or more elements to one or more data points in the one or more pseudo-image representations.

The intelligent generation of image-like representations of ordered and heterogenous data service 402 may initiate a machine learning operation to learn and train a machine learning model to transform the one or more data sets into one or more pseudo-image representations.

To further illustrate, consider the operations depicted in FIGS. 4A-4B. First, consider FIG. 4A as a general overview. An ordered collection of heterogenous data ("D") 416 may be received as "input" data by the image-like representation generation component 420. That is, a collection of ordered heterogeneous data points ("P") may be input into the image-like representation generation component 420. One or more machine learning/deep learning task ("T") performed on an image (e.g., one or more image processing tasks ("T") results) may be provided as input into the image-like representation generation component 420. Additionally, the image processing task ("T") results may be mapped ("M") 414 to one or more areas of the image-like representation ("I") and the map ("M") 414 may be provide as input into the image-like representation generation component 420.

The image-like representation generation component 420 may process the input data and provide a result 430 of applying the one or more image processing tasks ("T") to the ordered collection of heterogenous data ("D") 416. The image-like representation generation component 420 may build/generate an interpretable explanation 432 (e.g., a human-interpretable explanation) of the result 430.

Turning now to FIG. 4B, the ordered collection of heterogenous data ("D") 416 may be received as "input" data (e.g., the input may be one or more ordered heterogeneous data points ("P") into a function 415 ("F") to map ("V" in graph 455) the input data points (P) in the collection of heterogenous data ("D") 416 to generate the image-like representation ("I"), where function is F(D) is equal to the image-like representation ("I") (e.g., F(D)=I), which may be illustrated in graph 455 depicting the image-like representation ("I") having a Y-axis and an X-axis, which may be a bi-dimensional (e.g., 2D image-like representation) of the ordered collection of heterogenous data ("D") 416.

A machine/deep learning task ("T") 412 may be performed on the image-like representation ("I") and the results (R) of the machine/deep learning task ("T") 412 on the image-like representation ("I") (e.g., more specifically applied to the ordered collection of heterogenous data ("D") 416), where the function is T(I)=R. The result 430 of the machine/deep learning task ("T") 412 may be mapped to one or more areas of the image-like representation ("I"), where the mapping function is M(R, I)=A (where "A" is area and the "A" is part of I). An explanation function 440 may be applied to generate an interpretable explanation 432 (e.g., G(D, A, R)=E), where E is a human-interpretable explanation of R. That is, an interpretable explanation 432 (e.g., a human-interpretable explanation) of the result 430 may be built, created, and/or generated.

In one embodiment, by way of example only, the machine learning operations as used herein may include, for example, an instance of IBM® Watson® such as Watson® Analytics (IBM® and Watson® are trademarks of International Business Machines Corporation). By way of example only, the machine learning component 470 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

To further illustrate operations of FIG. 4A-4B, consider FIGS. 5A-5E depicting intelligent generation of image-like representations of ordered and heterogenous data to enable explainability of artificial intelligence results in the medical domain based on data generated with the synthetic patient data generator where the data is realistic, but synthetic.

In one aspect, in the medical domain the term "pathway" may refer to the ordered collection of heterogeneous data. A pathway may include data describing one or more events and other information pertaining to a specific condition of the patient. For illustration purposes only, in this example, a short pathway may be a pathway with few/limited data points. Thus, in the example a set of classes may be 1) demographics (e.g., patient details, immunizations, allergies), 2) observations and images (e.g., results of blood tests and other observations), 3) conditions and health care plans (e.g., diagnose and care plans), and/or 4) medications (e.g., list of prescriptions), procedures (e.g., treatment list), and/or 5) outcomes (e.g., readmission, survival, eradication of diseases, etc.).

For example, FIG. 5A diagram 500 depicts table 502 relating to the medical pathway that includes 10 events (e.g., rows). The first column in table 502 shows what class the event belongs to and the second column (e.g., "temporal type") indicates if the event is an isolated event, or the start/stop of an event that has duration in time. For example, the row number 5 shows a "PROCEDURES" event, which is an isolated event happening on the date "2016-02-14." Alternatively, row number 3 depicts the start of a "MEDICATIONS" event (e.g., having a date of 2016-02-14), which then stops on row 10 (2016-05-14). The third column of table 500 shows the event identifier ("ID") and the last column in table 500 shows the date/time information.

In FIG. 5B, diagram 515 depicts a visualization image 504 of the same pathway of table 500, which one or more isolated events are represented as "dots." The events (e.g., medications, conditions, and/or care plans) with duration are represented as horizontal bars. It should be noted that multiple "data points" may be associated to a single event, such as in the "observations" event that occurs on the date of 2016-02-27. Here, there may be six data points (e.g., rows in the table) and each data point may have 3 values (e.g., columns in table 500).

Figure 5C:
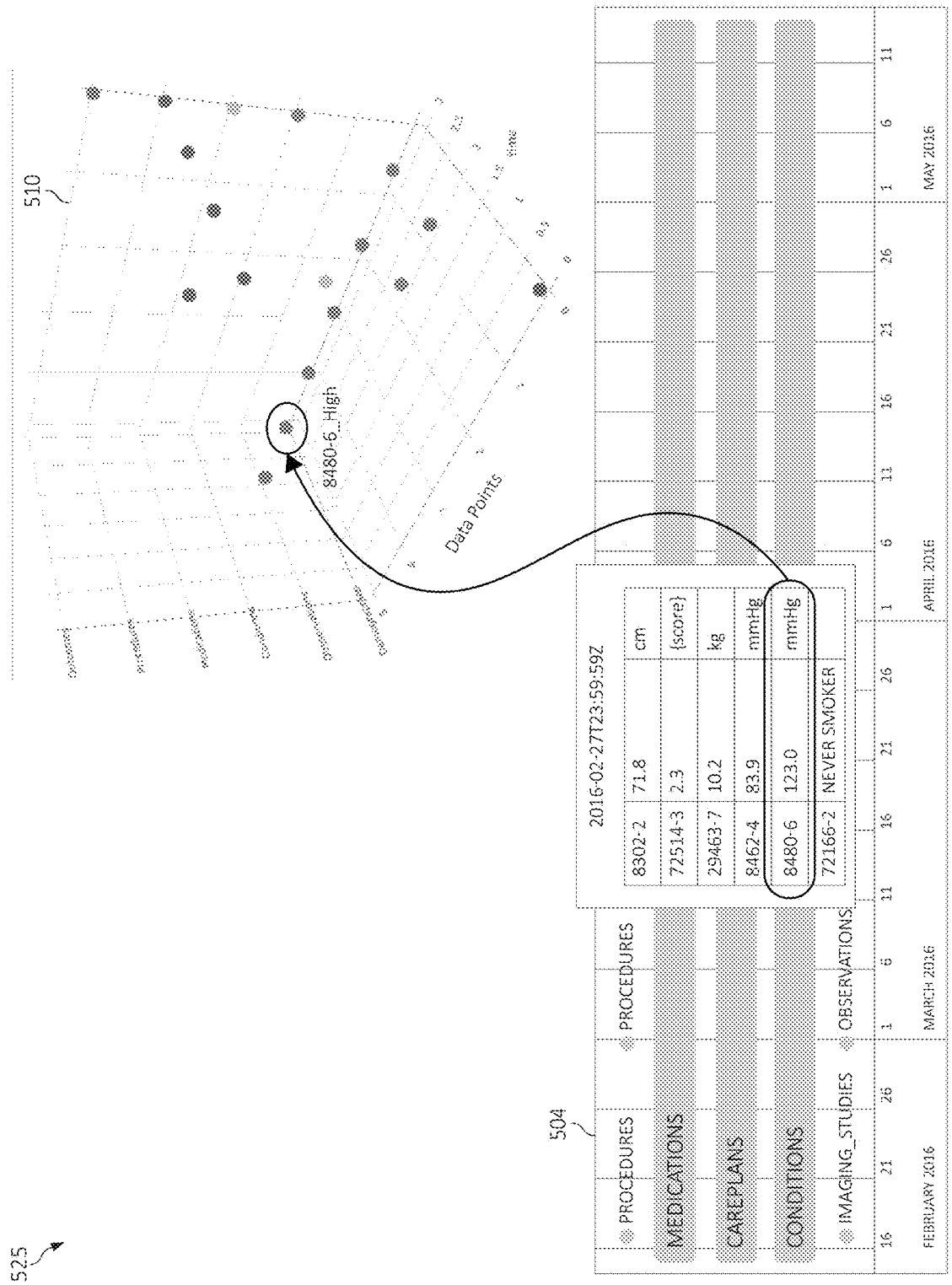
Figure 5D:
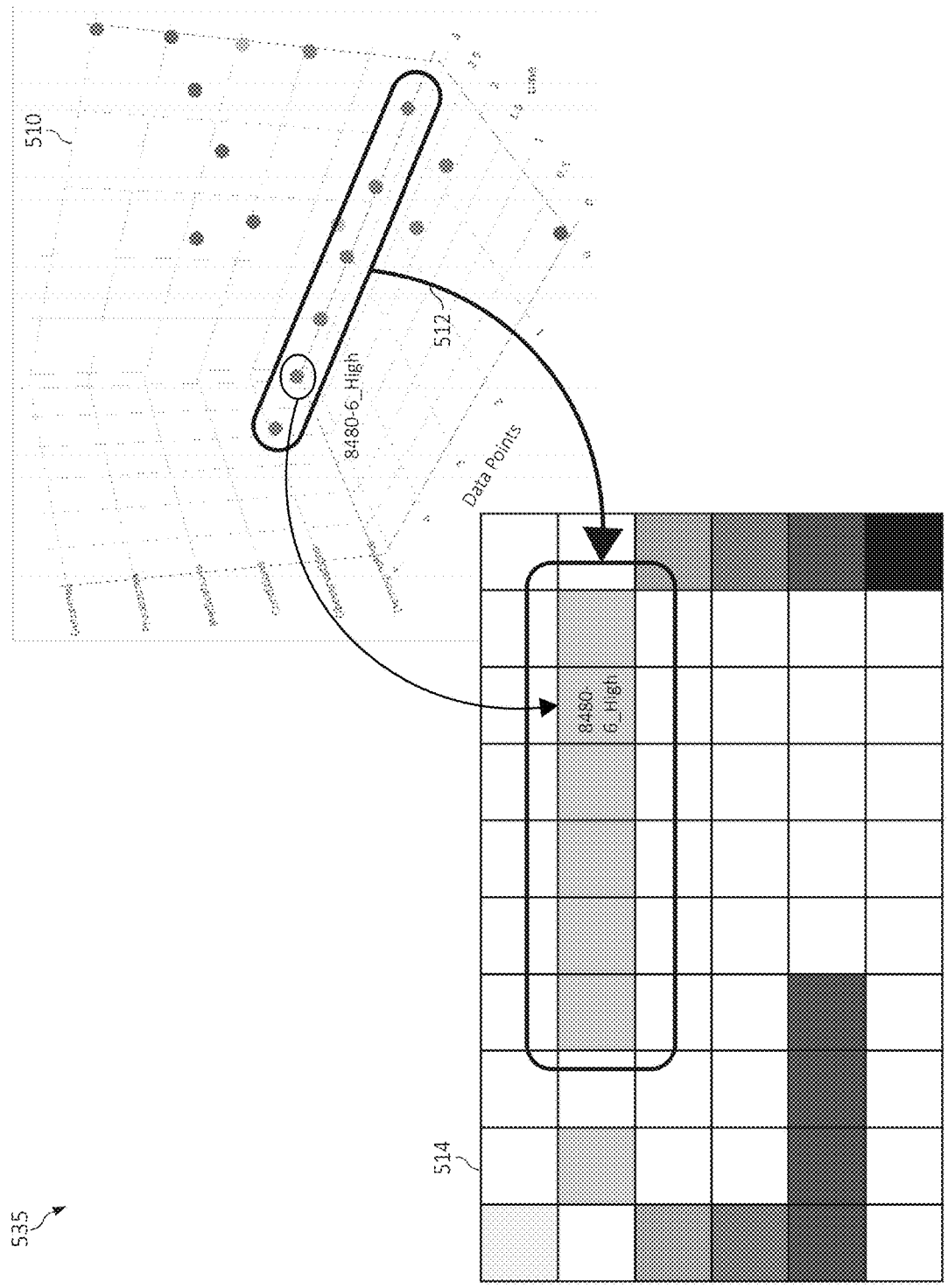

At this point, diagram 525 of FIG. 5C illustrates transforming one or more data sets (e.g., visualization image 504 from FIG. 5B) into one or more pseudo-image representations to enable one or more image processing tasks for image processing. That is, the present invention may represent a pathway data as a 3D matrix 510 (e.g., the one or more pseudo-image representations depicted in the 3D matrix 510), where the X-axis provides the order of events (e.g., in time) and the Z-axis spans the various classes (e.g., outcomes, procedures, etc.). The Y-axis of the 3D matrix 510 provides the data points having the same order across a class (concurrence). It should be note that the 3D matrix 510 is an intermediate representation of the final pseudo-image representations. The value of data points may be discretized according to one or more selected/defined rules. Each data point may be represented as a single discretized value such as, for example, 123.0 millimeters of mercury ("mmHg") may result in "High", thus yielding a single discretized value such as, for example, "8480-6_High".

As illustrated in FIG. 5C, diagram 535 illustrates the operations for transforming one or more data sets into one or more pseudo-image representations to enable one or more image processing tasks for image processing may include flattening the 3D matrix 510 into a 2D matrix 514, where the X-axis provides/gives the order of events (e.g., time) and the Y-axis spans the various classes (e.g., outcomes, procedures, etc.). For example, multiple concurrent data points such as, for example, data points 512 having the same class may be placed one after the other (e.g. sequentially) along the X-axis of the 2D matrix 514.

Figure 5E:
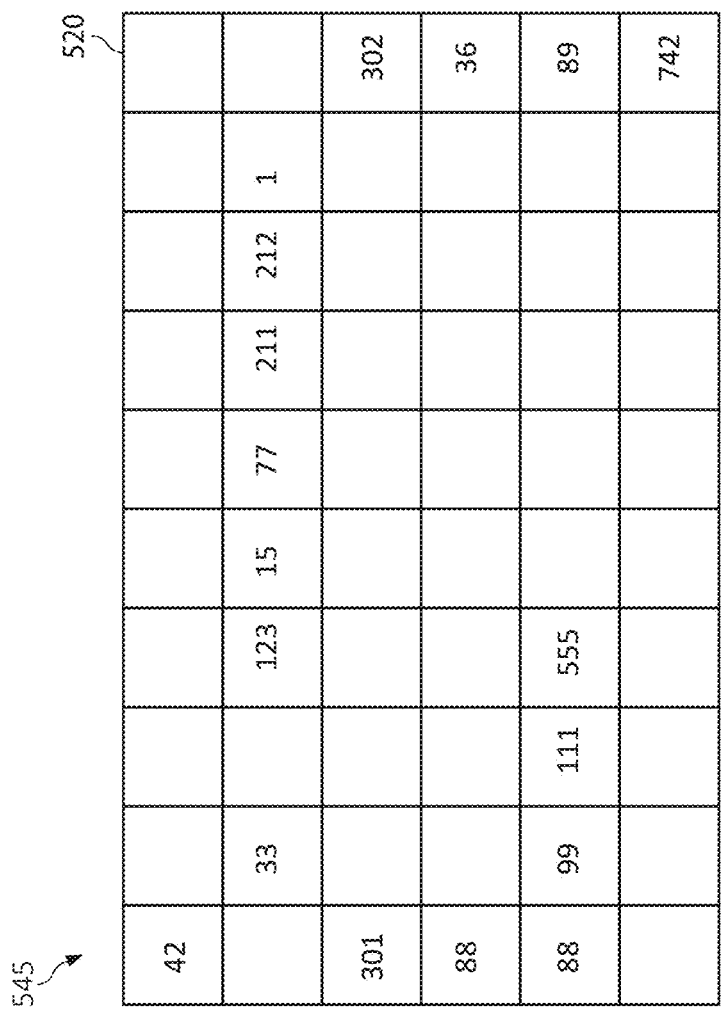

Finally, as illustrated in FIG. 5E, diagram 545 illustrates the 2D matrix 514 may be encoded as an encoded 2D matrix 520. For example, each distinct value in 2D matrix 514 may be encoded with a distinct numeric value. The resulting encoded 2D matrix 520 be considered as an image, where empty cells may be, for example, black pixels.

Figure 5F:
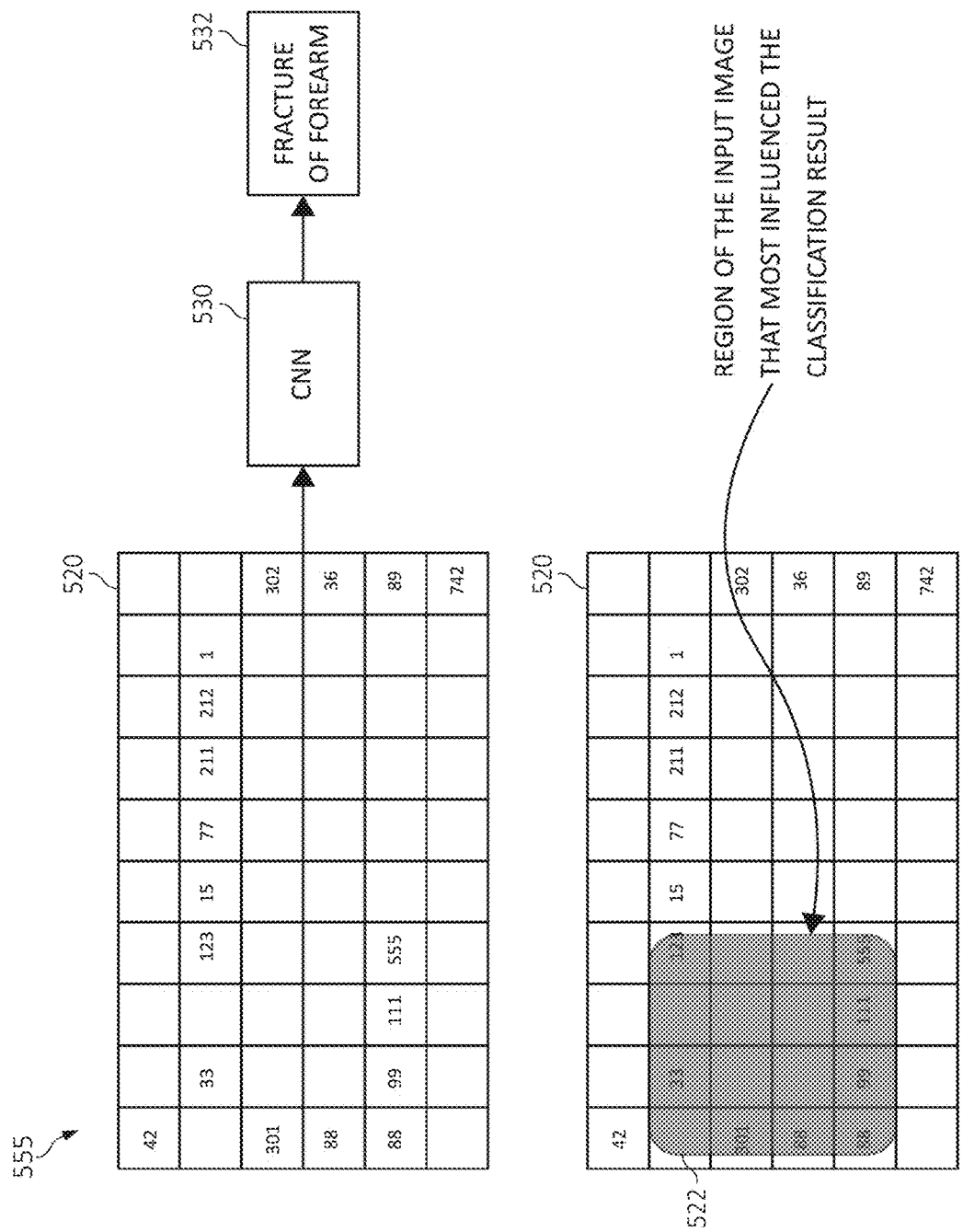

Turning now to FIG. 5F, diagram 555 illustrates operations for use of the encoded 2D matrix 520. In one aspect, a training dataset of the images of the encoded 2D matrix 520 may be generated with associated labels (e.g., a label may be, for example, the medical condition that generated the pathway corresponding to the image). A conventional neural network ("CNN") 530 may be trained on the labelled images of the encoded 2D matrix 520 such that the CNN 530 learns to classify the labelled images of the encoded 2D matrix 520. For example, a new input image may be provided to the trained CNN 530 to obtain a classification result (e.g., a CNN result 532) such as, for example a fracture of a forearm. One or more image processing tasks may be employed for visualizing and understanding the CNN 530 to interpret the classification result (e.g., CNN result 532). For example, one or more visualizing and understanding operations may be used to highlight the regions 522 of the input image (e.g., the encoded 2D matrix 520) that most influences the probability of the classification result (e.g., CNN result 532).

From the values of the highlighted region 522 of the encoded 2D matrix 520, the present invention may return back to the original data points in the input data (e.g., this is possible based on the generation of the encoded 2D matrix 530 as described herein). The original data points may then be used to generate an understandable interpretation (e.g., a human understandable explanation) of the classification result (e.g., the CNN result 532). In one aspect, if the classes (rows) of the highlighted values (e.g., highlighted region 522) of the encoded 2D matrix 530 are human-interpretable, then the present invention may add this information to the explanation of the classification result (e.g., the CNN result 532).

Figure 6:
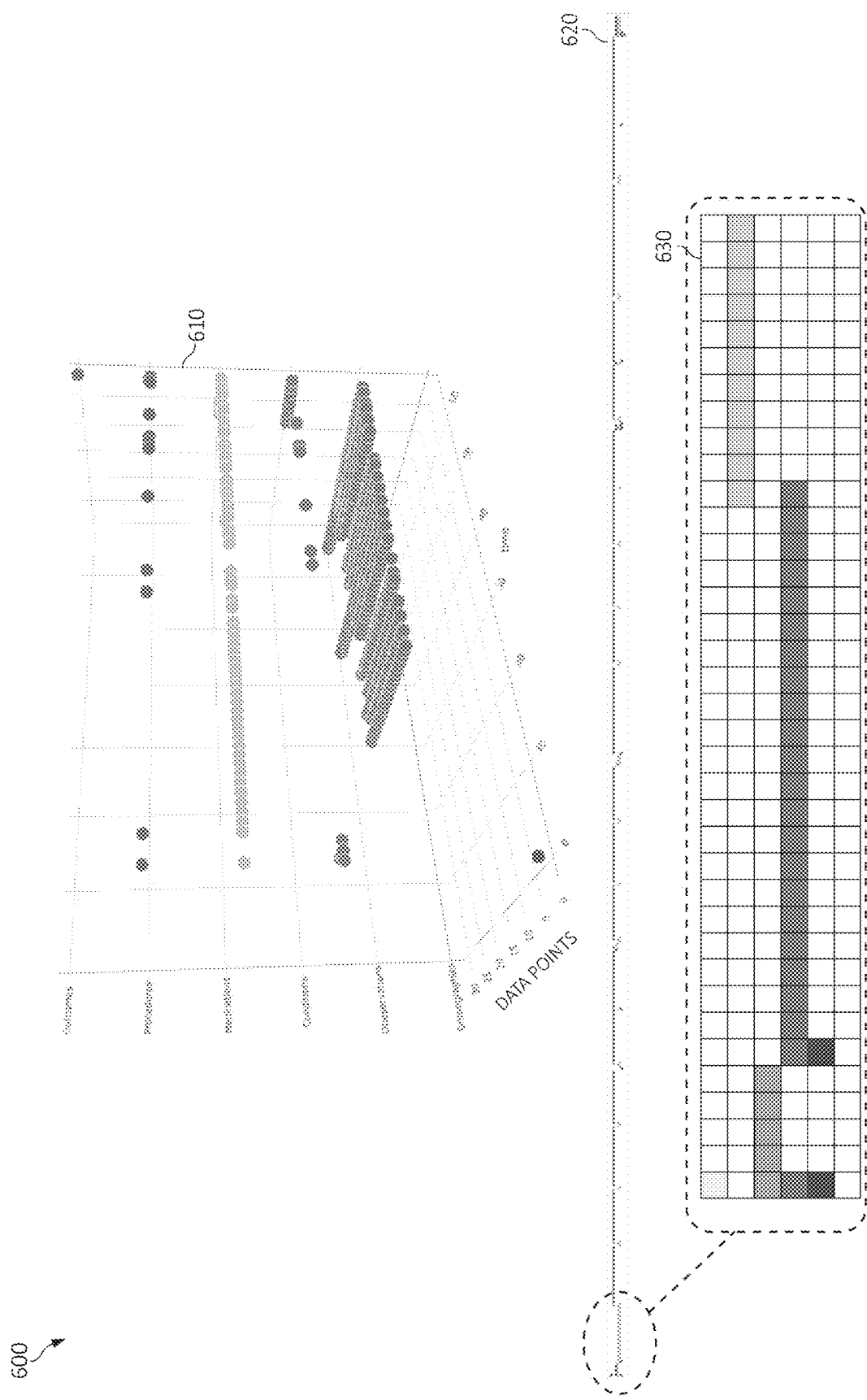
FIG. 6 is an additional block diagram depicting a three-dimensional (3D) and two-dimensional (2D) matrix representation of interpretation for image processing results using machine learning in which aspects of the present invention may be realized.

It should be noted that the above medical/healthcare example above is used by way of example only. Another example of a dataset that may be used is a timeline of a user in a social media network. For example, the timeline may be a time-ordered collections of heterogeneous data points (e.g., "social posts" or communications submitted to the social network by the user). The data points may be classified in a set of classes such as, for example, location, sentiment of the text posted by the user, tags (either assigned by user, or computed by software), and the like. Various embodiments as described herein may be applied, for example to the following use cases. For example, a social media network wants to analyze a user timelines to identify fake/illegitimate accounts, and provide human-interpretable explanations of why an account may be fake/illegitimate. The social media network may recommend social media associates (e.g., "friends") or products to user X and adds one or more motivation of why X may be interested. Thus, the present invention may apply to a variety of ordered and heterogeneous data sets such as, for example, even large datasets (e.g., big data) such as, for example, as illustrated in FIG. 6. FIG. 6 depicts real datasets that may be "larger" than the one the dataset in medical example of FIGS. 5A-5F. For example, FIG. 6 depict an image shown as the 3D matrix 610 and transforms the 3D matrix 610 into a 2D matrix 620, where a section 630 of the 2D matrix 620 is enlarged for closer inspection and analysis.

Figure 7:
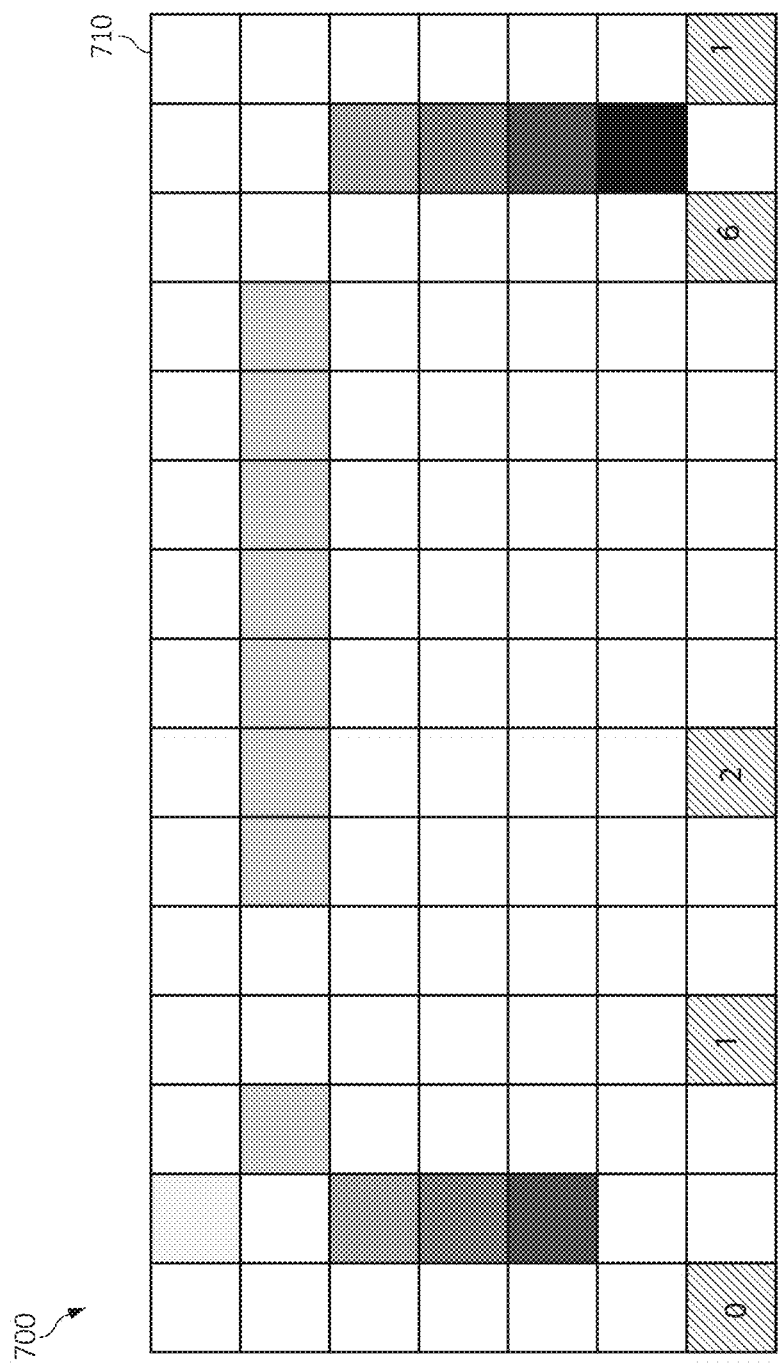
FIG. 7 is an additional block diagram depicting an ordered representation using a two-dimensional (2D) matrix representation for interpretation of image processing results using machine learning in which aspects of the present invention may be realized.

Turning now to FIG. 7, diagram 700 depicts an ordered representation using a two-dimensional (2D) matrix representation 710 for interpretation of image processing results using machine learning. In one aspect for some applications it may be useful to represent order in the form of time (e.g., elapsed time) in the 2D matrix representation 710. For example, continuing with the previous medical pathway example of FIGS. 5A-5E, in one aspect, the matrix representation 710 may be used to represent a time element such as, for example, the elapsing of "time." In one aspect, a single class may be added (e.g., add a bottom row) to represent (elapsed) time. A "marker" may be used and added in the time class to separate group of data points in the other rows that happen at the same time. Said differently, the group of columns delimited by two markers in the time class may contain data points happening at the same time (or in the same time window). When encoding the 2D matrix representation 710 with numbers, incremental numbers may be used that illustrated the relative elapsed time. For example, the five markers with 0, 1, 2, 6, 1 may be added to the bottom row of the 2D matrix representation 710. Incremental numbers may be used that show a total elapsed time. Alternatively, five markers with 0, 1, 2, 6, 1 may be replaced with 0, 1, 3, 9, 10 to show the total elapsed time. Also, an absolute value that represent the timestamps of the events may also be used.

Turning now to FIGS. 8A-4B, diagram 80 depicting using matrices for intelligent generation of image-like representations of ordered and heterogenous data to enable explainability of artificial intelligence results system according to various mechanisms of the illustrated embodiments is shown. In one aspect, one or more of the components, modules, services, applications, and/or functions described in FIGS. 1-7 may be used in FIG. 4.

In one aspect, for example, the function 415 ("F") to map ("V" in graph 455) the input data points (P) in the collection of heterogenous data ("D") 416 to generate the image-like representation ("I") of FIG. 4A-4B may be implemented as a function that takes a 3D matrix 810 of numeric values, and is flattened it a bi-dimensional matrix of numeric values. In the 3D matrix 810, the X-axis gives the order of events (e.g., time) and every position along the X-axis may correspond to a distinct order position (e.g., for example instant of time) in the heterogenous data such as, for example, the heterogenous data ("D") 416 of FIG. 4A-4B. The Z-axis spans the various classes of heterogenous data such as, for example, the heterogenous data ("D") 416 of FIG. 4A-4B.

The Y-axis gives the data points in the heterogenous data such as, for example, the heterogenous data ("D") 416 of FIG. 4A-4B having the same order across a class (concurrence). In one aspect, the value "V" at coordinate (x, y, z) from an input data point P may be calculated as follows. The coordinate "x" is the order position of input data points (P) in the collection of heterogenous data ("D"). If the order is time, then x is equal to zero ("x=0") is the smallest instant of time in heterogenous data ("D"), x=1 is the next instant of time in D, and so forth.

The coordinate z is the class of the data points (P). In one aspect, z may be determined/calculated using a set of rules. In another aspect, z may be determined/calculated using a classification operation from machine learning operations.

Also, multiple data points {P1, P2, ..., Pn} may have the same coordinate x for a given class z and may be sorted (e.g., lexicographically) into a list, and then, for each of the multiple data points, a coordinate y equal to their position in the sorted list may be assigned.

In an additional aspect, coordinate may be determined/calculated using a function H (e.g., a hash ("H") function) that takes the data points (P), and return a number. In one aspect, there may be multiple H functions (e.g., a family of H functions) that may be used such as, for example, one H function for each class of heterogenous data ("D"), and any two different H functions (e.g., Hi and Hj) having disjoint ranges. Every H function may have a domain equal to the points in the respective class of heterogenous data ("D"), and range equal to a finite set of the natural numbers. In one aspect, the range of an H function is smaller than its domain.

Figure 8B:
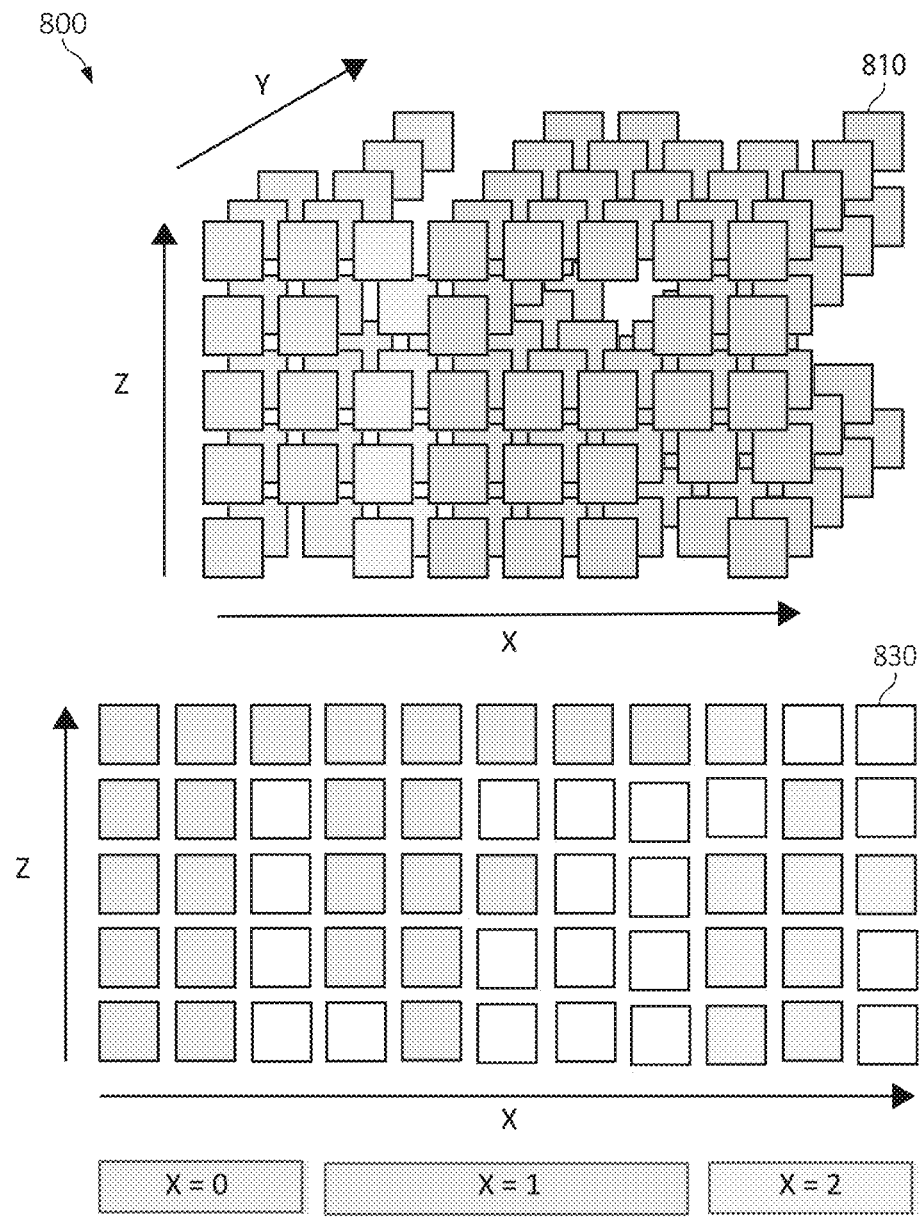

As illustrated in FIG. 8B, it should be noted that all the cells in the 3D matrix 810 may have a value V and therefore the matrix is sparse. The sparse 3D matrix 810 may be flattened into a bi-dimensional matrix (e.g., 2D matrix) 830 as follows. In one aspect, starting and sliding across the X axis and starting from value 0, and, and for every value x, the present invention may take the corresponding Z-Y plane and concatenate to the bi-dimensional matrix 830. The Y-axis of the Z-Y plane of the 3D matrix 810 becomes the X' axis (e.g., horizontal) of the bi-dimensional matrix 830, which gives the order of the data points in the heterogenous data ("D"). The Z axis of the Z-Y plane of the 3D matrix 810 becomes the Y' axis (e.g., vertical) of the bi-dimensional matrix 830, which spans the classes of the heterogenous data ("D"). If the 3D matrix 810 contains no value at coordinate (x, y, z), a default value may be used that is outside the range of all H functions for the value at coordinate (x', y') of the bi-dimensional matrix 830.

In one aspect, an empty column may be added when sliding from X=n to X=n+1 along the X-axis of the 3D matrix 810. The empty column may be used to group in the cells of the bi-dimensional matrix 830 corresponding to input data points in heterogenous data ("D") having the same order X (e.g., data points happening at the same time).

It should be noted that the 3D matrix 810 (see also the 3D matrix of FIGS. 5A-5E) an associative array $A_{3D}$ (e.g., $A_{3D}(x, y, z) \rightarrow P$) may be built, created, and/or generated where the tuple (x, y, z) identifies a cell of the 3D matrix 810 with coordinates (x, y, z). The value data point ("P") is the input data point that has been mapped to cell (x, y, z). When flattening the 3D matrix 810 into the bi-dimensional matrix 830, an associative array $A_{2D}$: $A_{2D}(x', y') \rightarrow (x, y, z)$ may also be built, created, and, or generated where the tuple (x', y') identifies the cell of the bi-dimensional matrix 830 with coordinates (x', y').

The value (x, y, z) is a tuple identifying the cell of the 3D matrix 810 with coordinates (x, y, z) that corresponds to the cell with coordinate (x', y') in the bi-dimensional matrix 830. Using a mapping operation (e.g., mapping operation ("M") 414 to map the result of a machine/deep learning task ("T") to areas of the input image "I", see FIGS. 4A-4B and 5A-5E), the mapping function may be used where them mapping function M(R, I)=A, where A consists of a sub-set of the cells of the bi-dimensional matrix 830. For each cell $(x'_i, y'_j)$ in A, the present invention may determine/compute $A_{3D}(A_{2D}(x'_i, y'_j)) \rightarrow P_k$. Said differently, the two associative arrays may be used to identify the input data point $P_k$ that corresponds to the cell (x'i, y'j) in A. $P_k$ may be added, along with its order in the input dataset D, to a data-evidence set $S_{DE}$. If the classes corresponding to the Y' axis of the bi-dimensional matrix (i.e., the Z axis of the 3D matrix) are human-interpretable, then for each cell $(x'_i, y'_j)$ in A, the class corresponding to $y'_j$ may be added to a class-evidence set $S_{CE}$.

In an additional aspect, an explanation for the result "R" may be built, generated, and/or created by listing (via a natural language operation for listing in natural language) all the values in $S_{DE}$, and if not empty, all the values in $S_{CE}$. In an additional aspect, the explanation of result "R" may be represented in a graphical form such as, for example, by positioning the points in the set $S_{CE}$ on a timeline and assigning them different means for emphasis/illustrations (e.g., colors, symbols, patterns, etc.) depending on the information in set $S_{DE}$.

Figure 9:
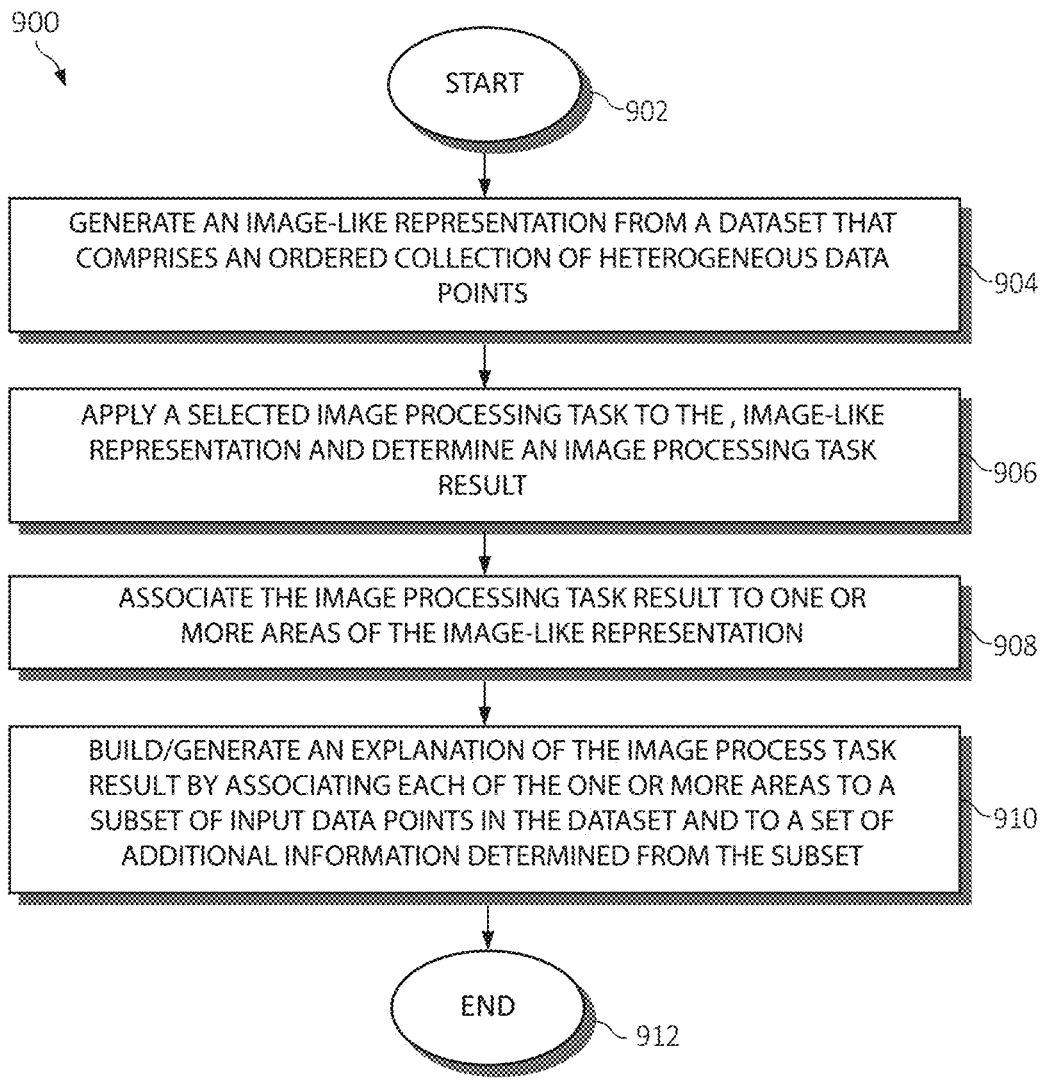
FIG. 9 is a flowchart diagram depicting an exemplary method for intelligent interpretation of image processing results using machine learning in a computing environment in computing environment in which aspects of the present invention may be realized.

Turning now to FIG. 9, a method 900 for implementing intelligent interpretation of image processing results using machine learning in a computing environment is depicted, in which various aspects of the illustrated embodiments may be implemented. The functionality 900 may be implemented as a method executed as instructions on a machine, where the instructions are included on at least one computer readable medium or on a non-transitory machine-readable storage medium. The functionality 900 may start in block 902.

An image-like representation may be generated from a dataset that comprises/includes an ordered collection of heterogeneous data points, as in block 904. A selected image processing task may be applied to the image-like representation and may determine an image processing task result, as in block 906. The image processing task result may be associated to one or more areas of the image-like representation, as in block 908. An explanation of the image processing task result may be built, created, and/or generated by associating each of the one or more areas to a subset of input data points in the dataset and to a set of additional information determined from the subset, as in block 910. The functionality 900 may end in block 912.

Figure 10:
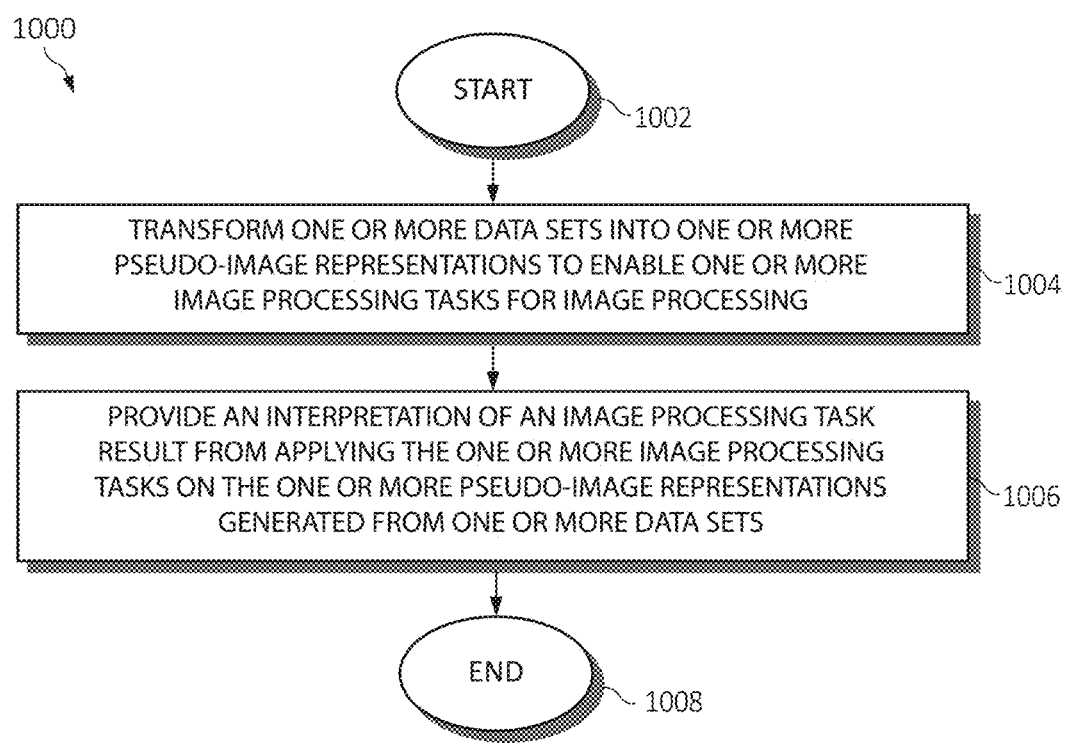
FIG. 10 is an additional flowchart diagram depicting an exemplary method for intelligent interpretation of image processing results using machine learning in a computing environment in computing environment in which aspects of the present invention may be realized.

Turning now to FIG. 10, a method 1000 for implementing intelligent interpretation of image processing results using machine learning in a computing environment is depicted, in which various aspects of the illustrated embodiments may be implemented. The functionality 1000 may be implemented as a method executed as instructions on a machine, where the instructions are included on at least one computer readable medium or on a non-transitory machine-readable storage medium. The functionality 1000 may start in block 1002.

One or more data sets may be transformed into one or more pseudo-image representations to enable one or more image processing tasks for image processing, as in block 1004. An interpretation of an image processing task result from applying the one or more image processing tasks on the one or more pseudo-image representations generated from one or more data sets, as in block 1006. The functionality 1000 may end in block 1008.

In one aspect, in conjunction with and/or as part of at least one block of FIGS. 9-10, the operations of methods 900 and/or 1000 may include each of the following. The operations of methods 900 and/or 1000 may generate the one or more pseudo-image representations from the one or more data sets having an ordered collection of heterogeneous data points, and/or apply the one or more image processing tasks to the one or more pseudo-image representations and determining an image processing task result.

The operations of methods 900 and/or 1000 may associate an image processing task result to one or more areas of the one or more pseudo-image representations, and/or build an explanation of the image processing task by associating each of the one or more areas of the one or more pseudo-image representations to a subset of input data points in the one or more data sets and to a set of additional information determined from the subset of input data points.

The operations of methods 900 and/or 1000 may define the one or more pseudo-image representations to include one or more elements, wherein the one or more elements include a value and a set of coordinates specifying a position of the one or more elements within the one or more pseudo-image representations, and/or map the one or more elements to one or more data points in the one or more pseudo-image representations.

The operations of methods 900 and/or 1000 may initiate a machine learning operation to learn and train a machine learning model to transform the one or more data sets into one or more pseudo-image representations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for providing intelligent generation of image-like representation of ordered and heterogenous data to enable explainability of artificial intelligence results in a computing environment, comprising:

transforming one or more data sets into one or more pseudo-image representations to enable one or more image processing tasks for image processing; and providing an interpretation of an image processing task result from applying the one or more image processing tasks on the one or more pseudo-image representations generated from one or more data sets, wherein providing the interpretation includes analyzing an output of the image processing task result to identify those of one or more data points of the one or more pseudo-image representations that most likely contributed to a classification of the output of the image processing task result, and returning to analyze those of the one or more data points as input into the one or more image processing tasks to generate a human-understandable interpretation as to a reasoning for the classification.

2. The method of claim 1, further including:

defining the one or more pseudo-image representations to include one or more elements, wherein the one or more elements include a value and a set of coordinates specifying a position of the one or more elements within the one or more pseudo-image representations; and mapping the one or more elements to the one or more data points in the one or more pseudo-image representations.

3. The method of claim 1, further including initiating a machine learning operation to learn and train a machine learning model to transform the one or more data sets into one or more pseudo-image representations.

4. A system for intelligent generation of image-like representation of ordered and heterogenous data to enable explainability of artificial intelligence results in a computing environment, comprising:

one or more computers with executable instructions that when executed cause the system to:

transform one or more data sets into one or more pseudo-image representations to enable one or more image processing tasks for image processing; and provide an interpretation of an image processing task result from applying the one or more image processing tasks on the one or more pseudo-image representations generated from one or more data sets, wherein providing the interpretation includes analyzing an output of the image processing task result to identify those of one or more data points of the one or more pseudo-image representations that most likely contributed to a classification of the output of the image processing task result, and returning to analyze those of the one or more data points as input into the one or more image processing tasks to generate a human-understandable interpretation as to a reasoning for the classification.

5. The system of claim 4, wherein the executable instructions further:

define the one or more pseudo-image representations to include one or more elements, wherein the one or more elements include a value and a set of coordinates specifying a position of the one or more elements within the one or more pseudo-image representations; and map the one or more elements to the one or more data points in the one or more pseudo-image representations.

6. The system of claim 4, wherein the executable instructions further initiate a machine learning operation to learn and train a machine learning model to transform the one or more data sets into one or more pseudo-image representations.

7. A computer program product for providing intelligent generation of image-like representation of ordered and heterogenous data to enable explainability of artificial intelligence results by a processor, the computer program product comprising a non-transitory computer-readable storage medium having computer-readable program code portions stored therein, the computer-readable program code portions comprising:

an executable portion that transforms one or more data sets into one or more pseudo-image representations to enable one or more image processing tasks for image processing; and an executable portion that provides an interpretation of an image processing task result from applying the one or more image processing tasks on the one or more pseudo-image representations generated from one or more data sets, wherein providing the interpretation includes analyzing an output of the image processing task result to identify those of one or more data points of the one or more pseudo-image representations that most likely contributed to a classification of the output of the image processing task result, and returning to analyze those of the one or more data points as input into the one or more image processing tasks to generate a human-understandable interpretation as to a reasoning for the classification.

8. The computer program product of claim 7, further including an executable portion that:

defines the one or more pseudo-image representations to include one or more elements, wherein the one or more elements include a value and a set of coordinates specifying a position of the one or more elements within the one or more pseudo-image representations; and maps the one or more elements to the one or more data points in the one or more pseudo-image representations.

9. The computer program product of claim 7, further including an executable portion that initiates a machine learning operation to learn and train a machine learning model to transform the one or more data sets into one or more pseudo-image representations.

* * * * *